United States Patent [19]

Keogh et al.

[11] Patent Number: 4,489,029

[45] Date of Patent: Dec. 18, 1984

[54] COMPOSITIONS BASED ON ALKYLENE-ALKYL ACRYLATE COPOLYMERS AND SILANOL CONDENSATION CATALYSTS; AND THE USE THEREOF IN THE PRODUCTION OF COVERED WIRES AND CABLES

[75] Inventors: Michael J. Keogh, Somerville; Scott L. Wallace, Hillsborough; Geoffrey D. Brown, Bridgewater, all of N.J.

[73] Assignee: Union Carbide Corporation, Danbury, Conn.

[21] Appl. No.: 498,341

[22] Filed: Jun. 1, 1983

[51] Int. Cl.³ .............................. C08F 8/00; B29F 3/10
[52] U.S. Cl. ................................. 264/174; 264/83; 264/129; 524/382; 524/783; 525/106
[58] Field of Search ............... 264/174, 210.6, 83, 264/176 R, 129; 525/102, 106; 523/210, 200; 524/141, 382, 783

[56] References Cited

U.S. PATENT DOCUMENTS

| | | | |
|---|---|---|---|
| 3,646,155 | 2/1972 | Scott | 525/288 |
| 3,954,366 | 5/1976 | Fields et al. | |
| 4,058,583 | 11/1977 | Glander et al. | 264/176 R |
| 4,117,063 | 9/1978 | Voigt et al. | 264/176 R |
| 4,117,195 | 9/1978 | Swarbrick et al. | 264/236 |
| 4,125,333 | 11/1978 | Fields | |
| 4,136,132 | 1/1976 | Poole | |
| 4,142,040 | 2/1979 | Jabarin et al. | |
| 4,155,690 | 5/1979 | Checkland et al. | |
| 4,228,255 | 10/1980 | Fujimoto et al. | 264/176 R |
| 4,291,136 | 9/1981 | Keogh | 525/102 |
| 4,297,310 | 10/1981 | Akutsu et al. | 264/83 |
| 4,328,323 | 5/1982 | Keogh | 525/106 |
| 4,343,917 | 8/1982 | Keogh | 525/106 |
| 4,351,790 | 9/1982 | Hochstrasser et al. | 264/347 |
| 4,367,190 | 1/1983 | Beach | |
| 4,369,289 | 1/1983 | Keogh | 523/200 |
| 4,404,349 | 9/1983 | Keogh | 525/102 |
| 4,446,279 | 5/1984 | Keogh | 264/174 |

FOREIGN PATENT DOCUMENTS

| | | | |
|---|---|---|---|
| 710243 | 5/1965 | Canada | 264/174 |
| 2419209 | 11/1975 | Fed. Rep. of Germany | 264/174 |
| 2738764 | 3/1979 | Fed. Rep. of Germany | 264/174 |
| 2832120 | 1/1980 | Fed. Rep. of Germany | 264/174 |
| 58-1924 | 1/1983 | Japan | |
| 2101138 | 1/1983 | United Kingdom | |

Primary Examiner—Jeffery Thurlow
Attorney, Agent, or Firm—James C. Arvantes; Robert C. Brown

[57] ABSTRACT

The disclosure of this application relates to compositions based on alkylene-alkyl acrylates and silanol condensation catalysts which are useful in the preparation of water-curable, silane modified alkylene-alkyl acrylate copolymers, capable of extrusion about wires and cables.

12 Claims, 1 Drawing Figure

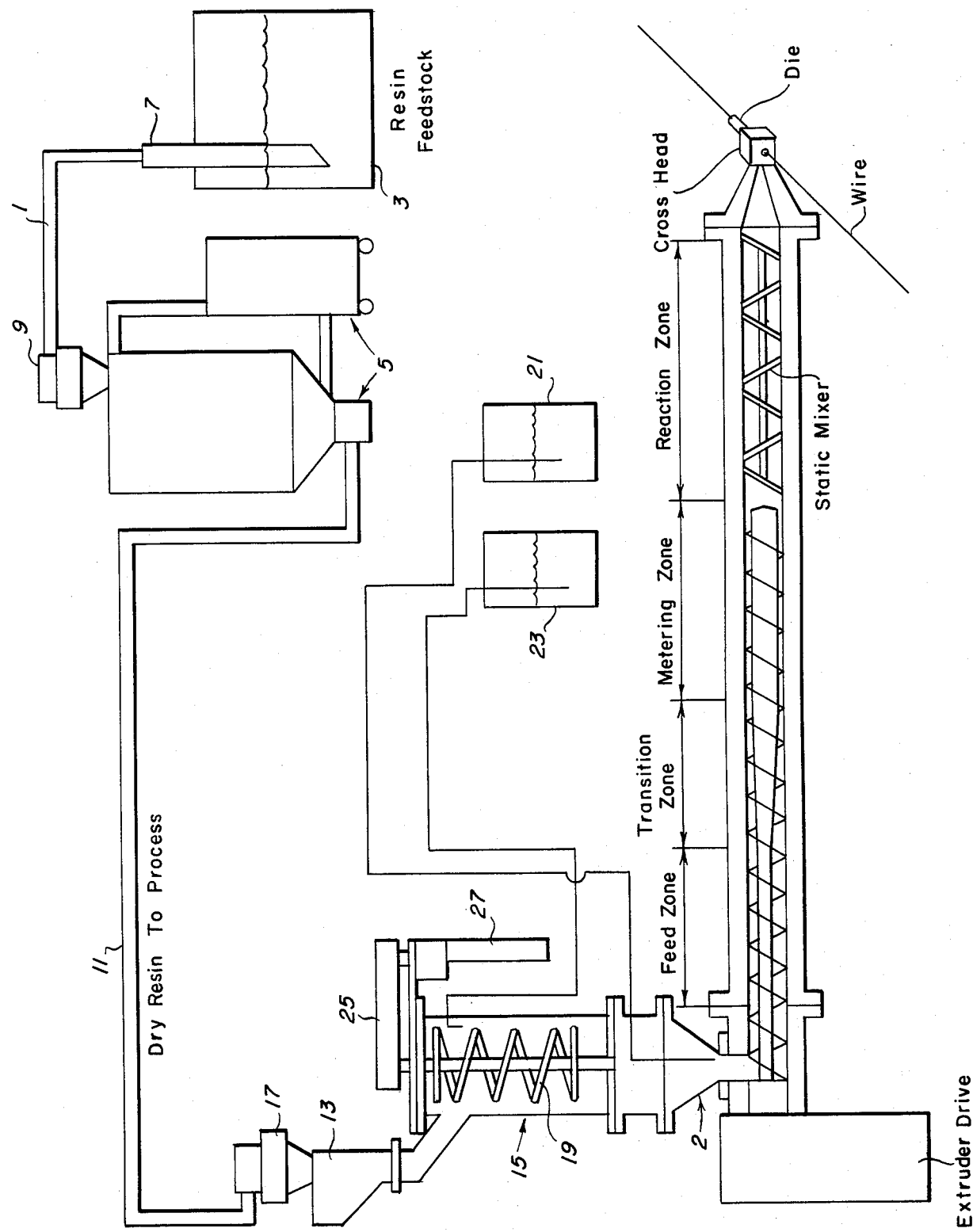

COMPOSITIONS BASED ON ALKYLENE-ALKYL ACRYLATE COPOLYMERS AND SILANOL CONDENSATION CATALYSTS; AND THE USE THEREOF IN THE PRODUCTION OF COVERED WIRES AND CABLES

SUMMARY OF THE INVENTION

The invention disclosed in this application relates to compositions, based on alkylene-alkyl acrylate copolymers and silanol condensation catalysts, which are useful in the preparation of water-curable, silane modified alkylene-alkyl acrylate copolymers. More particularly, this invention relates to a process of extruding water-curable, silane modified alkylene-alkyl acrylate copolymers and compositions based thereon about wires and cables to provide coverings, such as insulation and jacketing, characterized by improved properties.

BACKGROUND OF THE INVENTION

Silane modified alkylene-alkyl acrylate copolymers described in U.S. Pat. No. 4,328,323 granted May 4, 1982 and 4,291,136 granted Sept. 22, 1981, are particularly desirable for use in extrusion applications as these polymers and compositions based thereon can be cured by a simple water treatment, as opposed to the more conventional peroxide cure, to crosslinked products of high crosslinked density. As a result, silane modified alkylene-alkyl acrylate copolymers, as described, and compositions based thereon are especially useful in extrusion applications, being capable of extrusion under a wide latitude of processing conditions.

BRIEF DESCRIPTION OF THE INVENTION

The present invention, in one aspect, relates to compositions, based on alkylene-alkyl acrylate copolymers and silanol condensation catalysts, which are particularly useful in an improved process of extruding water-curable, silane modified alkylene-alkyl acrylate copolymers and compositions based thereon about wires and cables.

In the process aspect of this invention, an alkylene-alkyl acrylate copolymer or composition based thereon is admixed with a silanol condensation catalyst, the resultant composition soaked with an organo titanate catalyst and the soaked composition admixed with a polysiloxane or monomeric silane with the result that the alkylene-alkyl acrylate copolymer reacts with the polysiloxane or monomeric silane to form a product, containing a water-curable, silane modified alkylene-alkyl acrylate copolymer, which is then extruded about a wire or cable.

The process, as described, results in coverings, such as insulation and jacketing, about wires and cables which are characterized by a number of improved properties, as shown by the data of the examples of this application.

BRIEF DESCRIPTION OF THE DRAWING

The drawing is a schematic view of the preferred system, including the extrusion apparatus for carrying out the process of this invention using a 2½ inch extruder.

DETAILED DESCRIPTION OF THE INVENTION

As previously stated, the present invention, in one aspect, relates to compositions based on an alkylene-alkyl acrylate copolymer and a silanol condensation catalyst.

The alkylene-alkyl acrylate copolymers are known copolymers, normally solid at ambient temperatures, produced by reacting an alkene with an alkyl acrylate.

Suitable alkenes include ethylene, propylene, butene-1, isobutylene, pentene-1, 2-methylbutene-1, 3-methylbutene-1, hexene-1, heptene-1, octene-1, vinyl chloride, styrene and the like and mixtures thereof.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with the alkenes fall within the scope of the following formula:

wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate and the like and mixtures thereof.

Alkylene-alkyl acrylate copolymers generally have a density (ASTM D 1505, with conditioning as in ASTM D 147-72) of about 0.92 to about 0.94 and a melt index (ASTM D 1238 of 44 psi tested pressure) of about 0.5 to about 500 decigrams per minute.

For purposes of the present invention, the preferred copolymer, generally a copolymer of ethylene-ethyl acrylate, has about one to about 50 percent by weight combined alkyl acrylate, preferably has about 2 to about 40 percent by weight combined alkyl acrylate.

Silanol condensation catalysts, that is compounds which accelerate the crosslinking of the watercurable, silane modified alkylene-alkyl acrylate copolymers are also well known compounds. Among such compounds can be noted the metal carboxylates such as dibutyltin dilaurate, stannous acetate, stannous octoate, lead naphthenate, zinc octoate, iron-2-ethyl hexoate and the like, organic bases such as ethylamine, hexylamine, dibutylamine, piperidine and the like, and acids such as mineral acids and fatty acids and the like.

For purposes of this invention, dibutyltin dilaurate is preferred.

Exemplary of organo titanate compounds which catalyze the reaction between the polysiloxane or monomeric silane and the alkylene-alkyl acrylate copolymer, and are used to soak the alkylene-alkyl acrylate compositions, as previously described, are those falling within the scope of Formula II.

wherein each $R^2$, which can be the same or different, is hydrogen or a hydrocarbon radical having one to 18 carbon atoms inclusive, preferably one to 14 carbon atoms inclusive. By definition of a titanate, one $R^2$ must be a hydrocarbon radical.

Exemplary of suitable hydrocarbon radicals are alkyl radicals such as methyl, ethyl, n-propyl, isopropyl, butyl, octyl, lauryl, myristyl, stearyl and the like, cycloaliphatic radicals such as cyclopentyl, cyclohexyl and the like, aryl radicals such as phenyl, methylphenyl, chlorophenyl and the like; alkaryl radicals such as benzyl and the like.

Particularly desirable titanates falling within the scope of Formula II are those wherein each $R^2$ is alkyl having one to 18 carbon atoms inclusive, preferably one to 14 carbon atoms inclusive, exemplified by tetrabutyl titanate, tetraisopropyl titanate and the like.

Other suitable organo titanates are the organo titanium chelates such as tetraoctylene glycol titanium, triethanol amine titanate, titanium acetyl acetonate, titanium lactate and the like.

Polysiloxanes, which are suitable for purposes of this invention, contain repeating units of the formula:

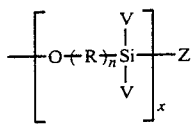

Formula III wherein R is a hydrocarbon radical or oxy substituted hydrocarbon radical, each V, which can be the same or different, is hydrogen, a hydrocarbon radical or a hydrolyzable group; Z is a hydrolyzable group; n is an integer having a value of one to 18 inclusive and x is an integer having a value of at least 2, generally 2 to 1000 inclusive, preferably 5 to 25 inclusive.

Illustrative of suitable hydrocarbon radicals for R are alkylene radicals having one to 18 carbon atoms inclusive, preferably one to 6 carbon atoms inclusive, such as methylene, ethylene, propylene, butylene, hexylene and the like; alkoxy radicals having one to 18 carbon atoms inclusive, preferably one to 6 carbon atoms inclusive such as methyloxymethyl, methyloxypropyl, ethyloxyethyl, ethyloxypropyl, propyloxypropyl, propyloxybutyl, propyloxyhexyl and the like.

As stated, each V can be hydrogen, a hydrocarbon radical or a hydrolyzable group. Illustrative of suitable radicals are alkyl radicals having one to 18 carbon atoms inclusive, preferably one to 6 carbon atoms inclusive such as methyl, ethyl, n-propyl, isopropyl, n-butyl, n-hexyl and the like; alkoxy radicals having one to 18 carbon atoms inclusive, preferably one to 6 carbon atoms inclusive, such as methoxy, ethoxy, propoxy, hexoxy, dodecyloxy, methoxyethoxy and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl, cyclohexyloxy and the like.

Z, as previously stated, is a hydrolyzable group among which can be noted alkoxy radicals as previously described for V and R; oxy aryl radicals such as oxyphenyl and the like; halogens such as chlorine and the like.

Polysiloxanes containing repeating units falling within the scope of Formula III can be prepared as described in U.S. Pat. No. 4,328,323 by condensing and polymerizing a silane falling with the scope of Formula IV.

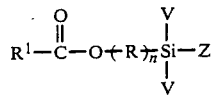

Formula IV wherein $R^1$ is a hydrocarbon radical, as for example, an alkyl radical having one to 18 carbon atoms inclusive, preferably one to four carbon atoms inclusive such as methyl, ethyl, n-propyl, isopropyl, n-butyl and the like; alkylene radicals having two to 18 carbon atoms inclusive, preferably two to 4 carbon atoms inclusive such as etylene, propylene and the like; aryl radicals having six to ten carbon atoms inclusive such as phenyl, benzyl and the like. Other variables are as previously defined.

Exemplary of suitable silanes falling within the scope of Formula IV are the following:

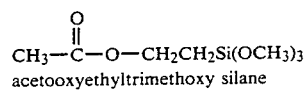
acetooxyethyltrimethoxy silane

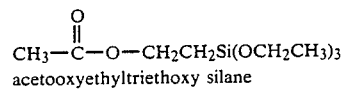
acetooxyethyltriethoxy silane

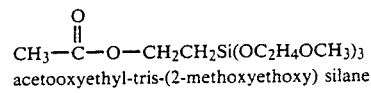
acetooxyethyl-tris-(2-methoxyethoxy) silane

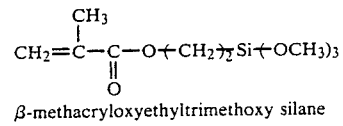
β-methacryloxyethyltrimethoxy silane

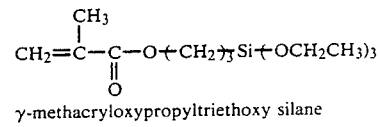
γ-methacryloxypropyltriethoxy silane

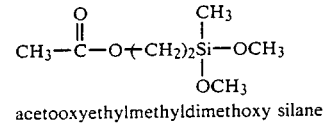
acetooxyethylmethyldimethoxy silane

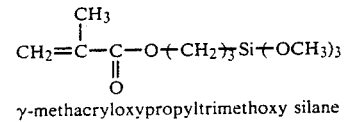
γ-methacryloxypropyltrimethoxy silane

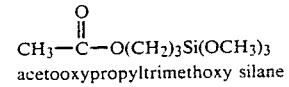
acetooxypropyltrimethoxy silane $$CH_3-\overset{O}{\underset{\|}{C}}-O(CH_2)_3Si(OCH_2CH_3)_3$$
acetooxypropyltriethoxy silane

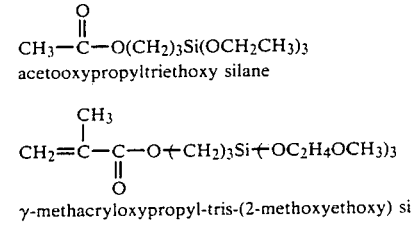
γ-methacryloxypropyl-tris-(2-methoxyethoxy) silane

Preferred polysiloxanes have a viscosity of about 0.5 poise to about 150 poise, preferably about one to about 20 poise as determined by a Gardner-Holdt bubble viscometer at a temperature of 25° C.

As previously stated, monomeric silanes, for instance, silanes falling within the scope of Formula IV can be used in lieu of the polysiloxanes.

Referring now to the accompanying drawing, a pelletized mixture of alkylene-alkyl acrylate copolymer and silanol condensation catalyst is fed from resin feed stock bin (3) to a dryer system (5) by means of a vacuum tube (7) and vacuum loader (9), through conveyer line (1).

The amount of silanol condensation catalyst admixed with the alkylene-alkyl acrylate copolymer is sufficient to accelerate the water-cure of the silane modified alkylene-alkyl acrylate copolymer. As a rule, this amount is about 0.001 to about 0.5, preferably about 0.005 to about 0.1 percent by weight based on the weight of the copolymer.

Admixing of the silanol condensation catalyst, the alkylene-alkyl acrylate copolymer and desired additives is carried out in a compounding system such as a twin screw extruder wherein the ingredients are melted and mixed. The mixture is subsequently pelletized by methods known in the art.

The pelletized mixture of alkylene-alkyl acrylate copolymer and silanol condensation catalyst is dried in dryer system (5) to insure that the water content thereof is below about 500 ppm, preferably below about 300 ppm.

From dryer system (5), the pelletized mixture is fed through conveyer line (11) and into receiver (13) of vertical blender (15) by means of vacuum loader (17).

Vertical blender (15) contains an open helix mixer (19) which aids in dispersing the organo titanate throughout the pelletized mixture. The organo titanate is pumped into the top of vertical blender (15) from reservoir (23). Helix mixer (19), driven by motor (25) through gear reducing driving belt (27) and uplifting agitator (not shown) of vertical blender (15) thoroughly mix the pellets and the organo titanate.

Residence time of the pelletized mixture in vertical blender (15) is sufficient to soak the organo titanate into the pellets as evidenced by absence, essentially, of liquid (wetness) on the surface of the pellets.

The resultant soaked pellets drop directly into the hopper (2) of an extruder assembly and are contacted therein with polysiloxane or monomeric silane pumped from reservoir (21).

The amount of silane "reactant" fed into hopper (2) is generally about 0.05 to about 10, preferably about 0.3 to about 5 percent by weight, based on the weight of the copolymer.

The amount of organo titanate used to soak the pelletized mixture, previously defined, is sufficient to inhibit the adverse effects of moisture, present in the composition or generated therein during processing. Generally, the weight ratio of organo titanate to polysiloxane or monomeric silane is at least about 0.1 to 1, generally about 0.5 to about 10 to one, preferably about 1 to about 5 to one, and most preferably about 1 to about 3 to 1.

The total reaction mixture containing the alkylene-alkyl acrylate copolymer, the silanol condensation catalyst, organo titanate and silane "reactant" passes into the extruder wherein the reaction mixture is mixed, reacted and extruded out of the extruder onto a wire.

In the extruder assembly shown, designed by Geoffrey Brown, the reaction mixture passes through a series of zones of the extruder assembly, being in sequence, a feed zone, a transition zone, a metering zone, a reaction zone defined by a static mixer and is extruded from the extrusion die onto a wire.

Feed zone function is to convey the pellets forward to maintain a constant supply of material to the next section. Typical temperatures are about 100° C. to about 180° C. preferably about 140° C. to about 160° C. for this zone.

Transition zone function is to compress the pellets into a shallower channel. The tightly packed pellets are deformed, sheared, and for the most part, melted in this section due to a combination of mechanical energy input and thermal energy from the hot barrel. Typical temperatures are about 130° C. to about 200° C., preferably about 150° C. to about 175° C. for this zone.

Metering zone function is to complete the melting process, to provide a steady and metered output rate, and to pressurize the melt to force it through the die. Typical temperatures are about 130° C. to about 220° C., preferably about 160° C. to about 190° C. for this zone.

Reaction zone function is to allow sufficient time at the metering zone temperature to insure that complete reaction or grafting has occurred.

To the silane modified copolymers can be added various additives in amounts well known in the art. This is conveniently accomplished by formulating compositions containing additives, alkylene-alkyl acrylate copolymers and silanol condensation catalysts and processing the compositions as described.

Exemplary of such additives are those disclosed in U.S. Pat. No. 4,328,323 and U.S. Pat. No. 4,353,997, among which can be noted halogenated flame retardant additives, antimony oxide, ground calcium carbonate, clay and the like.

Also, the compositions of this invention can contain hydrous and/or water-releasing fillers.

These fillers, which are generally used in amounts of about 1 to about 250 percent by weight based on the total weight of the copolymer can be exemplified by the following: hydrous fillers such as hydrous clay, non-conductive carbon blacks, conductive carbon blacks such as Ketjen Black EC, zinc borate, talc, and the like; water-releasing fillers such as aluminum trihydrate, magnesium hydroxide, calcium hydroxide, barium hydroxide, zinc hydroxide, precipitated calcium carbonate, basic magnesium carbonate and the like.

Particularly desirable compositions contain, as additives, aluminum trihydrate or magnesium hydroxide and a scorch inhibiting compound.

Among suitable scorch inhibiting compounds can be noted alcohols, particularly alcohols having a boiling point higher than 100° C. such as octanol, decanol, dodecanol, myristyl alcohol, stearyl alcohol and the like. Also suitable are esters of such alcohols such as dioctyl phthalate, dioctyl adipate, dioctyl succinate and the like.

Plasticizers for vinyl resins are also suitable as scorch inhibiting compounds. These plasticizers include cyclic plasticizers such as phthalate plasticizers among which can be noted butyl decyl phthalate, butyloctyl phthalate, dibutyl phthalate, dicyclohexyl phthalate, dicyclooctyl phthalate and the like. Phosphate esters such as cresyl diphenyl phosphate, 2-ethylhexyl diphenyl phosphate, triphenyl phosphate and the like; trimellitic acid esters such as the n-octyl and n-decyl ester of trimellitic acid and the like; acyclic plasticizers such as the di(2-(2-butoxyethoxy)ethyl) ester of adipic acid, the di(2-ethylhexyl) ester of adipic acid, the diisodecyl ester of adipic acid and the like; oleic acid esters such as butyl oleate, glyceryl trioleate, methyloleate and the like as further disclosed in a publication entitled *Vinyl Plasticizers,* Report No. 62, April 1970, Stanford Research Institute, Menlo Park, Calif.

Suitable scorch inibiting compounds, that is compounds which reduce scorch and do not undergo a crosslinking reaction with the components of the composition to which they are added are used in amounts sufficient to reduce scorch, generally in amounts of about 0.5 to about 20 percent by weight, preferably about 2 to about 10 percent by weight based on the weight of the total composition.

The curing or crosslinking of the silane modified alkylene-alkyl acrylate copolymer and compositions based thereon is effected by exposing the copolymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water and heating to elevated temperatures or by exposure to steam.

Generally, curing is effected at temperatures on the order of about 23° C. to about 180° C., preferably about 70° C. to about 100° C.

In Example 1 which follows, the composition was extruded onto a #14 AWG copper wire using a system as shown in the accompanying drawing wherein the extruder had:

1. a 30 to 1 length to diameter grooved barrel (grooved at Feed Zone).
2. a 20 to 1 polyethylene compression screw, having a 2.5 inch diameter, which was tapered and cored, allowing for control of temperature by feeding water into the core.
3. four sets of radial mixing pins equally spaced along the metering zone.
4. band or cylindrically cast heaters, providing independent temperature control of each zone.

A run, Example 1, was carried out using the system shown in the accompanying drawing wherein the materials used were a pelletized mixture of dibutyltin dilaurate and Formulation I; tetraisopropyl titanate and polysiloxane.

| Formulation I | |
|---|---|
| | Percent by Weight |
| Copolymer of Ethylene-Ethyl Acrylate Containing 15% by Weight Combined Ethyl Acrylate-Melt Index 1.6 | 56.15 |
| Talc Coated with Zinc Stearate | 21.68 |
| Antimony oxide | 2.50 |
| Calcium Carbonate | 2.50 |
| Ethylene (Bis-tetrabromophthalimide) (Flame Retardant Additive) | 16.29 |
| Polymerized 1,2-dihydro-2,3,4-trimethyl Quinoline (Antioxidant) | 0.58 |
| Vinyl-tris(2-methoxy) Silane | 0.30 |
| | Percent by Weight Based On Formulation I |
| Dibutyltin Dilaurate | 0.04 |
| Tetraisopropyl Titanate | 0.79 |
| Polysiloxane | 0.80 |
| Weight Ratio of Organo Titanate to Polysiloxane | ~1 |

The polysiloxane used was prepared according to Example 3 of U.S. Pat. No. 4,328,323 with the exception that 235 grams (1.03 moles) of ethyl laurate were substituted for ethyl benzoate.

The polysiloxane can be depicted, ideally, as follows:

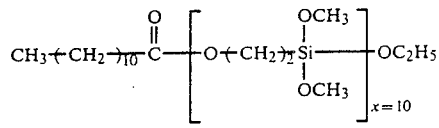

| | |
|---|---|
| Moisture content of pelletized mixture after drying | 149 ppm |
| Soak time of pelletized mixture of dibutyltin dilaurate and Formulation I with organo titanate | 10 minutes |
| Screw speed | 94 rpm |
| Screw cooling water fed into core at a temperature of 53° C. and rate of 75 gallons per hour - temperature at removal - 68° C. | |
| Rate of extrusion | 199 lbs. per hour |
| Wire speed | 500 feet per minute |

| | Temperature and Pressure Profile | | | | |
|---|---|---|---|---|---|
| | Feed Zone | Transition Zone | Metering Zone | Reaction Zone | Die |
| Temperature of Heaters, Set Temperature, (°C.) | 154 | 150 | 154–171 | 160 | 204 |
| Material Temperature, (°C.) | 153 | 159 | 166 | 163–175 | 191 |
| Pressure, (psi) | — | 3200–4600 | 5000–5500 | 5300–5400 | 5200 |

For purposes of conducting the Rheometer test, described below, insulation was stripped from the wire, placed in a water bath, which was at a temperature of 75° C., for 18 hours and then pressed into 0.150 inch thick plaques under the following conditions:

| | |
|---|---|
| Pressure | 3 Tons |
| Temperature | 125° C. |
| Time of Cycle | 5 minutes heating 5 minutes cooling |

| Tests and Test Results | |
|---|---|
| Rheometer-ASTMD-2084-75 | reported in inch-lbs and indicates the level of cure |
| Number of Voids | cross-section of uncured insulation was examined under 40× magnification and voids counted per grid |
| Thickness of Insulation | 37 mils |
| Spark faults | test described in Underwriters Laboratories Standard UL-44 "Rubber Insulated Wires And Cables" as revised January 1, 1982, paragraphs 70-72. This test determines if there are any minute holes in the uncured insulation which would allow the current to |

| Tests and Test Results | |
|---|---|
| | short to ground. UL specifies that there be no faults in a completed cable, but industry standards allow for a maximum of one per 3000 feet of cable as made in a commercial run. The UL requirement is then met by cutting out the voids or faults from the cable and splicing the ends together. |
| Stability | calculated from diameter fluctuations and expressed as ± percent of total output. Normal deviation of extrusion lines is ± 2 percent |
| Test Results | |
| Rheometer | 42 inch-lbs. |
| Number of Voids | 15 per grid |
| Spark Faults | 0 per 13,500 feet of insulation |
| Stability | ±1.8 percent |

A second run, Control 1, was carried out in essentially the same manner as Example 1, using the same materials, with the exception that the dibutyltin dilaurate, tetraisopropyl titanate and polysiloxane were admixed and introduced into the system as a mixture at the hopper (2).

| Test Results | |
|---|---|
| Rheometer | 37 inch-lbs |
| Number of Voids | 468 per grid |
| Spark Faults | 0 per 16,000 feet of insulation |
| Stability | ±9.0 percent |

In order to further show the advantages of adding the silanol condensation catalyst to the alkylene-alkyl acrylate copolymer, three runs were carried out essentially as described with respect to Example 1, using Formulation I and the same extruder system with the following exceptions:
1. Smooth barrel extruder was used
2. An Acrison Horizontal Blender was used in lieu of the vertical blender shown in the accompanying drawing
3. Control 2 was carried out by adding a mixture of organo titanate, polysiloxane and silanol condensation catalyst to Formulation I in the Acrison Horizontal Blender
4. Control 3 was carried out by adding a mixture of organo titanate and polysiloxane to a pelletized mixture of silanol condensation catalyst and Formulation I in the Acrison Horizontal Blender
5. Example 2 was carried out in a manner similar to Example 1 by combining the silanol condensation catalyst with Formulation I, soaking the pelletized mixture with organo titanate in the Acrison Horizontal Blender and adding the polysiloxane to the soaked composition at the extruder throat as in Example 1

| Percent By Weight Based on Formulation I | | | |
|---|---|---|---|
| | Example 2 | Control 2 | Control 3 |
| Dibutyltin Dilaurate | 0.03 | 0.05 | 0.04 |
| Tetraisopropyl Titanate | 0.41 | 0.36 | 0.37 |
| Polysiloxane (same as Example 1) | 0.90 | 1.08 | 1.12 |
| Moisture Content | | | |
| of pelletized mixture | 233 ppm | — | — |
| of Formulation I | — | 171 ppm | 190 ppm |

| Operating Conditions of Extruder Assembly | | | |
|---|---|---|---|
| | Example 2 | Control 2 | Control 3 |
| Temperatures set/actual in °C. | | | |
| Feed Zone | 138/— | 137/— | 154/— |
| Transition Zone | 149/149 | 154/156 | 165/162 |
| Metering Zone | 179/180 | 177/180 | 182/184 |
| Reaction Zone | 176/183 | 177/189 | 182/193 |
| Die | 204/199 | 204/199 | 204/203 |
| Pressures psi | | | |
| Transition Zone | 1200–2400 | 400–3000 | 800–2600 |
| Metering Zone | 3400–4800 | 2400–5000 | 2000–4800 |
| Reaction Zone | — | — | — |
| Die | 5000 | 4400 | 5100 |
| Screw Speed, rpm | 118 | 116 | 116 |
| Output Rate, lbs/hr | 183 | 200 | 200 |
| Wire Speed, fpm | 500 | 500 | 500 |
| Screw Cooling, Amount of water, gph | 75 | 75 | 75 |
| Temperature of Water in °C. | 81 | 81 | 79 |
| Temperature of Water out, °C. | 88 | 91 | 93 |
| Properties | | | |
| Rheometer | 40 | 42 | 55 |
| Voids | 5 | 30 | 40 |
| Spark Faults | 0 per 9000 ft. | 14 per 13,500 ft. | 0 per 1000 ft. |
| Stability (%) | ±7.6 | ±16.8 | ±15.3 |
| Thickness of Insulation (average) | 33.5 mils | 37.5 mils | 37.5 mils |

If desired mixtures of reactants, catalyst, additives and the like can be used if so desired.

Also, it is to be understood that within the essence of the claimed invention, the operating conditions of the extrusion system such as temperatures, pressures and the like can be varied to accommodate the actual composition being extruded, output of the extruder and the like.

The disclosures of all patents noted are incorporated herein by reference.

What is claimed is:

1. A process of extruding a composition about a wire or cable which comprises soaking a composition consisting essentially of an alkylene-alkyl acrylate copolymer and a silanol codensation catalyst with an organo titanate, admixing said soaked composition with a polysiloxane or monomeric silane with the result that the polysiloxane or monomeric silane reacts with said alkylene-alkyl acrylate copolymer to produce a product containing a water-curable, silane modified alkylene-alkyl acrylate copolymer and extruding said product about a wire or cable.

2. A process as defined in claim 1 wherein said polysiloxane contains units of the formula:

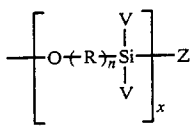

wherein R is a hydrocarbon radical or an oxy substituted hydrocarbon radical, each V is hydrogen, a hydrocarbon radical or a hydrolyzable group, Z is a hydrolyzable group, n is an integer having a value of one to 18 and x is an integer having a value of at least 2.

3. A process as defined in claim 1 wherein the monomeric silane has the formula:

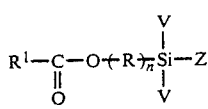

wherein $R^1$ is a hydrocarbon radical and the other variables are as defined in claim 2.

4. A process of extruding a composition about a wire or cable which comprises drying a composition consisting essentially of an alkylene-alkyl acrylate copolymer and a silanol condensation catalyst to a water content below about 500 ppm, soaking said dried composition with an organo titanate, admixing said soaked composition with a polysiloxane or monomeric silane with the result that the polysiloxane or monomeric silane reacts with said alkylene-alkyl acrylate copolymer to produce a product containing a water-curable, silane modified alkylenealkyl acrylate copolymer and extruding said product about a wire or cable.

5. A process as defined in claim 4 wherein the silanol condensation catalyst is dibutyltin dilaurate, the copolymer is an ethylene-ethyl acrylate copolymer, the organo titanate is tetraisopropyl titanate and the polysiloxane has the formula:

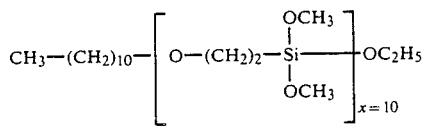

6. A process of extruding a composition about a wire or cable which comprises soaking a composition consisting essentially of an alkylene-alkyl acrylate copolymer and a silanol condensation catalyst with an organo titanate, admixing said soaked composition with a polysiloxane or monomeric silane, conveying the resultant composition through a feed zone of an extruder, maintained at a temperature of about 100° C. to about 180° C. with the result that a substantially steady supply of said composition is fed from said feed zone to the next succeeding zone of the extruder, the transition zone, compressing said composition in said transition zone, while the temperature of said transition zone is maintained at about 130° C. to about 200° C., to melt said composition, feeding said melt to the next succeeding zone of the extruder, the metering zone, which is maintained at a temperature of about 130° C. to about 220° C., pressurizing said melt in said metering zone in order to convey said melt to the next succeeding zone of the extruder, the reaction zone, through the reaction zone and to the extrusion die orifice in a steady and metered out-put rate, from whence the reacted composition is extruded as a shaped product, the temperature of the reaction zone being maintained at about 130° C. to about 220° C. and the residence time of said composition within said reaction zone being sufficient to insure that a substantially complete reaction has occurred to form a water-curable, silane modified copolymer.

7. A process as defined in claim 6 wherein the temperatures of said zones of the extruder are as follows:
Feed zone—about 140° C. to about 160° C.
Transition zone—about 150° C. to about 175° C.
Metering zone—about 160° C. to about 190° C.
Reaction zone—about 160° C. to about 190° C.

8. A process as defined in claim 6 wherein the organo titanate is tetraisopropyl titanate, the silane reactant is a polysiloxane, the alkylene-alkyl acrylate copolymer is an ethylene-ethyl acrylate copolymer and the silanol condensation catalyst is dibutyl tin dilaurate.

9. A process as defined in claim 6 wherein said resultant composition comprises a silanol condensation catalyst, tetraisopropyl titanate, a polysiloxane and an ethylene-ethyl acrylate copolymer.

10. A process as defined in claim 1 wherein the silanol condensation catalyst is dibutyl tin dilaurate.

11. A process as defined in claim 6 wherein the silanol condensation catalyst is dibutyl tin dilaurate.

12. A process as defined in claim 4 wherein the said water content is below about 300 ppm.

* * * * *